United States Patent
Gebhard et al.

(10) Patent No.: US 9,934,019 B1
(45) Date of Patent: Apr. 3, 2018

(54) APPLICATION FUNCTION CONVERSION TO A SERVICE

(71) Applicant: Amazon Technologies, Inc., Seattle, WA (US)

(72) Inventors: Derek Steven Gebhard, Huntington Beach, CA (US); Noah Emmanuel Crocker, Ann Arbor, MI (US)

(73) Assignee: Amazon Technologies, Inc., Seattle, WA (US)

( * ) Notice: Subject to any disclaimer, the term of this patent is extended or adjusted under 35 U.S.C. 154(b) by 434 days.

(21) Appl. No.: 14/572,661

(22) Filed: Dec. 16, 2014

(51) Int. Cl.
*G06F 9/44* (2006.01)
*G06F 9/445* (2018.01)
*H04L 29/08* (2006.01)

(52) U.S. Cl.
CPC ............... *G06F 8/65* (2013.01); *H04L 67/10* (2013.01)

(58) Field of Classification Search
CPC ............... G06F 8/65; G06F 8/67; H04L 29/06
USPC ......................................................... 717/171
See application file for complete search history.

(56) References Cited

U.S. PATENT DOCUMENTS

| | | | | |
|---|---|---|---|---|
| 5,581,696 A * | 12/1996 | Kolawa | ............... | G06F 11/3624 714/38.1 |
| 5,774,656 A * | 6/1998 | Hattori | ............... | H04L 61/15 709/202 |
| 5,790,789 A * | 8/1998 | Suarez | ............... | G06F 9/5055 709/202 |
| 5,946,694 A * | 8/1999 | Copeland | ............... | G06F 8/20 |
| 6,141,705 A * | 10/2000 | Anand | ............... | G06F 9/5044 709/203 |
| 6,633,888 B1 * | 10/2003 | Kobayashi | ............... | G06F 8/34 |
| 6,640,255 B1 * | 10/2003 | Snyder | ............... | G06F 9/465 719/315 |
| 6,854,006 B1 * | 2/2005 | Giroir | ............... | G06F 8/61 709/203 |
| 7,165,244 B2 * | 1/2007 | Maine | ............... | G06F 8/51 715/234 |
| 7,200,848 B1 * | 4/2007 | Slaughter | ............... | H04L 63/101 709/202 |
| 7,316,008 B1 * | 1/2008 | Dutta | ............... | G06F 8/74 717/136 |
| 7,484,209 B2 * | 1/2009 | Avakian | ............... | G06F 11/3476 717/118 |
| 7,586,493 B1 * | 9/2009 | Sams | ............... | G06F 9/5027 345/502 |

(Continued)

*Primary Examiner* — John Chavis
(74) *Attorney, Agent, or Firm* — Thorpe North & Western, LLP

(57) ABSTRACT

Technology for converting an application function to a service is provided. In one example, a method may include analyzing an application to identify a function of the application including logic. The method may further include extracting the function from the application. The function may be uploaded to a service provider environment to be implemented as an application service. A function access wrapper for the function may be retrieved from the service provider environment. The function access wrapper may be configured to call the application service in the service provider environment to execute the logic in the service provider environment and to receive a result of execution of the logic from the application service. The function access wrapper may be inserted into the application in the place of the function.

20 Claims, 7 Drawing Sheets

(56) References Cited

U.S. PATENT DOCUMENTS

| | | | | |
|---|---|---|---|---|
| 8,127,113 B1* | 2/2012 | Sinha | G06F 9/54 | 710/112 |
| 8,296,759 B1* | 10/2012 | Hutchins | G06F 9/45558 | 709/223 |
| 8,526,666 B1* | 9/2013 | Hadden | G06F 21/10 | 345/592 |
| 8,924,921 B2* | 12/2014 | Rush | G06F 17/30371 | 703/22 |
| 9,626,675 B2* | 4/2017 | Desai | G06F 8/65 | |
| 2002/0174236 A1* | 11/2002 | Mathur | G06F 17/30011 | 709/229 |
| 2003/0014544 A1* | 1/2003 | Pettey | H04L 29/06 | 709/249 |
| 2003/0084091 A1* | 5/2003 | Agarwalla | H04L 29/06 | 709/203 |
| 2003/0084435 A1* | 5/2003 | Messer | G06F 9/505 | 717/174 |
| 2004/0111400 A1* | 6/2004 | Chevalier | G06F 17/3089 | |
| 2004/0117479 A1* | 6/2004 | Jellum | G06F 17/3089 | 709/224 |
| 2004/0205613 A1* | 10/2004 | Li | G06F 17/30896 | 398/82 |
| 2004/0225660 A1* | 11/2004 | Carey | G06Q 30/06 | |
| 2005/0257219 A1* | 11/2005 | Holt | G06F 9/445 | 718/1 |
| 2006/0077941 A1* | 4/2006 | Alagappan | H04L 12/583 | 370/338 |
| 2006/0166663 A1* | 7/2006 | Haehnichen | H04M 1/7253 | 455/419 |
| 2007/0016949 A1* | 1/2007 | Dunagan | G06F 21/51 | 726/22 |
| 2008/0271059 A1* | 10/2008 | Ott | G06F 9/54 | 719/328 |
| 2010/0077378 A1* | 3/2010 | Maguire | G06F 9/547 | 717/106 |
| 2010/0131669 A1* | 5/2010 | Srinivas | G06F 9/5044 | 709/233 |
| 2013/0014082 A1* | 1/2013 | Kang | G06F 8/71 | 717/121 |
| 2013/0111562 A1* | 5/2013 | Lee | G06F 21/6218 | 726/4 |
| 2014/0096186 A1* | 4/2014 | Barton | H04L 67/10 | 726/1 |
| 2014/0173454 A1* | 6/2014 | Sanchez | G06F 8/20 | 715/747 |
| 2014/0280509 A1* | 9/2014 | Merrells | H04L 67/42 | 709/203 |
| 2015/0067819 A1* | 3/2015 | Shribman | H04L 67/06 | 726/12 |
| 2015/0268949 A1* | 9/2015 | Huber | G06F 17/3089 | 717/120 |

\* cited by examiner

APPLICATION FUNCTION CONVERSION TO A SERVICE

BACKGROUND

Various mobile and non-mobile computing devices underlie many applications and computing services. Such devices may be used for various forms of communication (e.g., voice calls and text messaging) as well as providing various functionality such as accessing and displaying websites, sending and receiving e-mails, taking and displaying photographs and videos, playing music and other forms of audio, creating digital content, and so forth. These, and numerous other functionalities, are generally performed by software applications either in the form of software components that are built-in to the mobile or non-mobile device's operating system or separate applications that run on top of the operating system.

Numerous competing manufacturers, developers, and other service providers offer hardware, software, or combinations of both hardware and software. As a result, a number of dissimilar and incompatible device platforms and environments have been developed. Some of the differences among these devices include their hardware components, operating systems and input and output capabilities. Some of the most widely used devices use different operating systems (e.g., Windows, iOS, Android and so forth), many of which have their own programming environments and software development tools.

Developing applications for different systems and devices often involves using various programming languages and specific techniques or code for different operating systems, hardware and so forth. As a result, many applications are not portable across devices or systems and developers often rewrite substantial portions of an application to support different devices.

DETAILED DESCRIPTION

Figure 1:
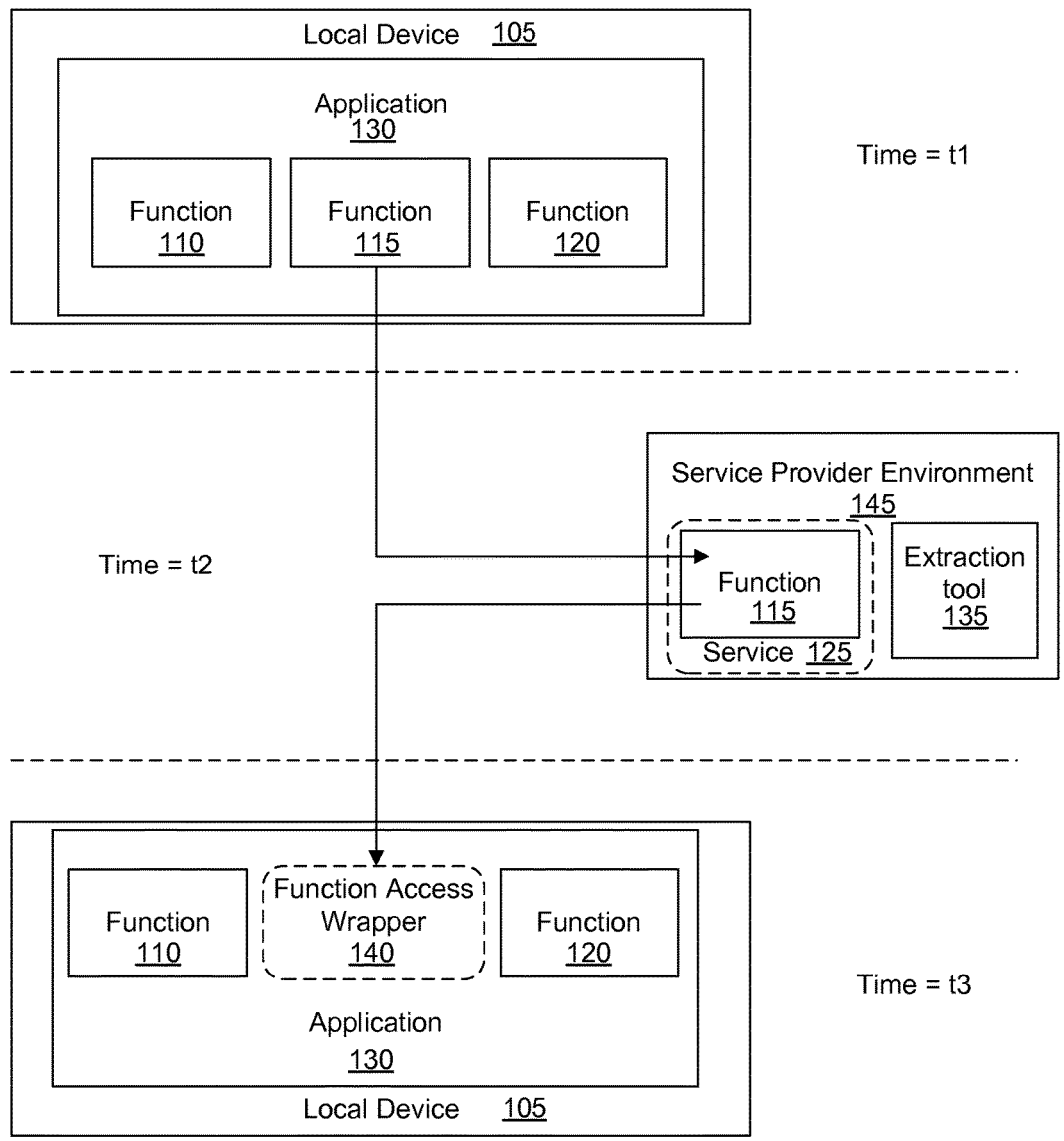
FIG. 1 is a schematic overview of a system for modifying an application by extracting a function from an application for use in a service provider environment and replacing the function with a function access wrapper in accordance with an example of the present technology.

Technology is provided for extracting a function from an application and creating an application service from the function. In one example, a method may include analyzing an application to identify a function of the application including associated logic. The method may further include extracting the function from the application. The function may be uploaded to a service provider environment to be implemented as an application service. A function access wrapper for the function may be retrieved from the service provider environment. The function access wrapper may be configured to call the application service in the service provider environment to execute the logic in the service provider environment and to receive a result of execution of the logic from the application service. The function access wrapper may be inserted into the application in the place of the function.

The function access wrapper acts as an interface between a caller (i.e., a component of the application calling the function) and wrapped code. In one example, the wrapped code portion of the function access wrapper may be code configured to translate function calls from components of the application to the API call and to make an API call to the application service. Another portion of the function access wrapper may be code to enable receipt of calls, replying to calls and otherwise interfacing with the application as if the function were present locally in the application. The application service may be a function wrapped in a service configured to receive the API calls from the function access wrapper, perform the function and return the results to the function access wrapper.

In a more specific example, the technology may be configured to enable the removal of public functions from a local application for execution remotely in a service provider environment. Specifically, a method may include analyzing an application to identify a public function of the application including any business logic. The public function may be configured for local execution on a computing device where the application is located. The public function may be extracted from the application, such as by removing the programming code for the function from the application and identifying the inputs and outputs (e.g., return values) for the function. The public function may be uploaded to a service provider environment and may there be implemented as an application service. For example, the service provider environment may provide a virtual machine configured to execute the function code extracted from the application. The virtual machine may generate a function access wrapper for the public function which may be retrieved by the computing device from the virtual machine. The function access wrapper may be configured to call the application service in the service provider environment to execute the business logic in the service provider environment. The function access wrapper may be further configured to receive a result of execution of the business logic from the application service for use by the application. The function access wrapper may be inserted into the application in the place of the public function. As a result, the application may be executed as before extraction of the public function, except that the public function is executed in the service provider environment and a result is returned to the application for continued execution of the application as if the public function were still present in the application on the computing device. While many of the examples described herein refer to public functions, the functions may not be tagged as public in some examples. For example, some non-object oriented language may have functions which are not tagged as public but which may be accessible and usable when outside of the application, such as will be described in greater detail below in the context of public functions.

FIG. 1 illustrates an example system for isolating an application function to make the function available as a service for any application to access. For purposes of illustration, FIG. 1 is divided into three portions representing three different, sequential time segments, t1, t2 and t3 to illustrate a sequence of operations. An application 130 has been programmed for execution on a local device 105 or for execution in a network accessible environment such as a service provider environment 145. A local device 105, system or platform upon which the application 130 is to execute may be decided in advance of programming the application and such a decision may guide the direction of the programming and functionality of the application 130. In recent years, mobile platforms have increased in popularity, leading to an increase in software development for mobile platforms. Performance of the software on the mobile platform may be dependent on capabilities of the specific device upon which the software is executed. Some applications 130 are located entirely in remote environments, such as service provider environments 145, in order to reduce device-specific performance issues and often to speed up application processing. However, an application 130 generally is built or programmed for either local or remote processing from the start and is often not migratable between local and remote environments without completely rebuilding the application. Furthermore, with multiple popular device platforms and operating systems, an entire application is often built multiple times for the different platforms.

While certain aspects of applications may be better suited to re-programming for each platform, business logic, as one example, is typically independent of graphical user interfaces or the like, which depend heavily on platform specific programming for desired results. The present technology enables the migration of business logic or other modular components or functions 110, 115, 120 of an application 130 programmed for execution on a local device 105 into a service provider environment 145. The business logic may be executed remotely and a result may be returned to the local device 105 to enable the application 130 to be executed as if the business logic were present and executed at the local device 105. The present technology may migrate business logic from a programmed application configured for local execution to the service provider environment 145 as compared with programming an application 130 for divided execution both locally on a local device 105 and remotely in a service provider environment 145 from the start.

The present technology may extract a function 115 (e.g., business logic) from an application 130 at time=t1 and, by implementing the function in the service provider environment 145 as a service 125 accessible via an API (Application Programming Interface) at time=t2, the function 115 may be executed faster than on typical local devices 105 and may be available to applications on multiple different platforms, as well as through internet sites and the like. Specifically (such as at time=t1), an extraction tool 135 may be provided to analyze code in the application to discover libraries or classes that are mobile. In other words, the extraction tool 135 may analyze the code to find public functions that may be moved.

Functions 110, 115, 120 may be private or public. A private function may be a function within a class that is accessible from within that class and is not accessible from outside that class. A public function, in contrast, may be accessed from outside the class. For example, a function may be a function in an object oriented programming language. If an application includes object objClock, based on a previous class, that has a public function getTime, the function may be called by using objClock.getTime. However, if the function is private, the statement objClock.getTime would not be allowed because the class does not allow access from outside the object. (In this example, the function may be referred to as a method, because functions are generally methods of an object in object oriented programming).

The function 115 may be extracted from the application 130 at time=t1 and exported or uploaded to a service provider environment 145. The function 115 may be implemented at the service provider environment 145 as a service 125 (or application service) at time=t2. Specifically, the service provider environment 145 may generate a service definition to handle requests for APIs or exposed functionality of the function. The service 125 may have code in specific high level languages, for example, a Java™ Archive (JAR) file, Objective C code, or any other suitable source code, intermediate code, or executable code that the service 125 is configured to execute when a request is received. The service 125 may then return a response or a result back to the application 130. Further, service listeners may also be setup to listen for the API calls from applications.

The application 130 may execute as if the function 115 were present on the local device 105 and locally in the application 130 by using a function access wrapper 140 at time=t3, which function access wrapper may be retrieved from the service provider environment 145. The service provider environment 145 may generate the function access wrapper 140 based on the inputs and outputs of the function 115 extracted from the application 130. The function access wrapper 140 may be configured to receive the inputs of the function 115 and to send the inputs to the application service 125 using an API. The service 125 may then return results from the function 115 in the service provider environment 145 to the function access wrapper 140 in the application 130, which may output the results in the same manner as the function 115 before extraction from the application 130. A function access wrapper 140 (which may also be referred to as a wrapper function) may be a subroutine in a software library or a computer program which is configured to call a second subroutine or a system call with little or no additional computation. Specifically in the context of the present technology, the function access wrapper may be a subroutine configured to call an API in the service provider environment. The function access wrapper 140 may provide a same interface with other functions 110, 120 or functionality of the application 130 as was provided by the function 115 but which makes calls to the application service 125 rather than executing logic locally.

The application 130 may be any type of application, including components for using a user interface (UI) or a software development kit (SDK). For these types of components, calls may be routed back to the local device 105 from the service provider environment 145 to execute a portion of the logic related to the UI or SDK, or a replacement SDK may be available which is usable in the service provider environment 145. For example, an SDK for saving a file or performing other operations may be re-created for use from the service provider environment 145. Business logic, such as for computational applications, for example, may be more easily extracted from an application 130 and executed in a service provider environment 145. An integrated development environment (IDE) or interactive development environment may be used at the local device 105 and may include the extraction tool for extracting the function 115 from the application 130. The IDE may be a software application that provides comprehensive facilities to computer programmers for software development and may include, for example, a source code editor, build automation tools and a debugger. The IDE may use a plugin or the like which enables a user to identify a class or function and request that the class or function be extracted and converted to a service 125. The IDE may be configured to upload the function to the service provider environment 145, retrieve the function access wrapper 140 and put the function access wrapper 140 in place within the application 130. In one example, the IDE may be configured to analyze the application 130 and provide options to a user for extracting functions, inserting function access wrappers for functions available at the service provider environment for insertion into applications, and so forth. The IDE may connect to an account for the service provider environment 145 to upload functions, retrieve function access wrappers, and so forth. The IDE may identify available function access wrappers configured for use with that IDE. For example, a user may use different IDEs for different computing platforms. The IDE may optionally automatically download the available function access wrappers or may simply provide a list of the available function access wrappers for that IDE to a user.

Business logic (or domain logic) may be a part of a program or application 130 (such as a mobile "app") that encodes real-world business rules that determine how data may be created, displayed, stored, and changed. Business logic may be contrasted with application software which might be concerned with lower-level details of managing a database, displaying the user interface, managing system infrastructure, or generally connecting various parts of the application. For example, business logic may refer to a portion of an enterprise system which determines how data is transformed or calculated, and how the data is routed to people or software (e.g., a workflow).

As a more concrete example, a government agency, such as the Department of Natural Resources, may have a business app for use on a mobile device which enables campground employees to check whether people staying at the campground have paid or are paying for the stay, view details regarding who is staying at the campground for how long, and so forth. Such an application may include business logic which may be moved to a service in the service provider environment. The business logic in the example is not specific to a user interface, but rather relates to data such as the examples above, or further such as how many people may stay at a particular campsite, how long a visitor may stay at a campsite and so forth. The business logic may include custom defined rules and business regulations.

An extraction tool 135 to extract the function from the application may reside on the local device 105 (inside or outside the application) and/or in the service provider environment 145. The extraction tool 135 may be code that is configured to analyze other code, such as code classes, JAR files, an iOS framework, or the like, and produce code as an output to run on a server, such as using a VM (virtual machine). The extraction tool 135 may detect, for example, that Java code is received and may identify public functions and detect or identify code to receive Java requests. The extraction tool 135 may instantiate a virtual machine on a computing instance in the service provider environment 145 configured for compatibility with Java code and Java requests and may generate the function access wrapper with an API for accessing the function as a service in the service provider environment 145 from the application 130.

The extraction tool 135 may reside wholly on a local device 105 to analyze an application 130, instantiate a remote computing instance, generate a function access wrapper 140, etc. The extraction tool 135 may reside wholly in the service provider environment 145 and may either upload the application 130 for analysis, extraction, etc. or may analyze the application 130 on the local device 105 and upload the public functions (e.g., function 115) to be implemented as application services 125. In yet another example, the extraction tool 135 may reside in part on the local device 105 and in part in the service provider environment 145 to analyze and extract the public function 115 at the local device 105, and to generate the function access wrapper 140 and execute the function 115 as an application service 125 in the service provider environment 145.

For each type of code input that may be implemented in the service provider environment 145, the appropriate code may be generated. For example, if the code (e.g., the function and/or application) is Java for execution in a Java Virtual Machine (JVM), a full Java stack may be generated in the service provider environment 145 for executing the code. If the code is in C#, a C# stack may be generated as a service that is configured to natively call the C# functions. Another approach to using native code in the service provider environment 145 may be bridging between a standard stack, such as a Java stack, and creating a bridge to code in another programming language from the application. For example, a Java Native Interface (JNI) may be used to create the bridge, or rather to map from one programming language to another, such as from native code to Java. In some instances, such a bridge may be readily available, but in other instances a bridge may not be readily available and may be manually programmed to bridge between the programming languages.

As one example implementation, a developer may have an application with a UI, functions and the like included to manage financial data. The application may include code having algorithms configured to create a graph of a user's money. Rather than limit the graphing functionality to this particular application on the platform for which the application was programmed, the present technology may be used to implement the graphing function as a service which may be called by other applications. For example, the graphing component may be called by third party applications or services, or may be called by other applications by the developer for a same or different platform as that upon which the original application is based.

A result of the present technology is the ability of developers to re-use portions of an application, particularly portions including logic, for other purposes and/or to speed up processing of the logic or separate the processing speed from the local hardware capabilities.

Figure 2:
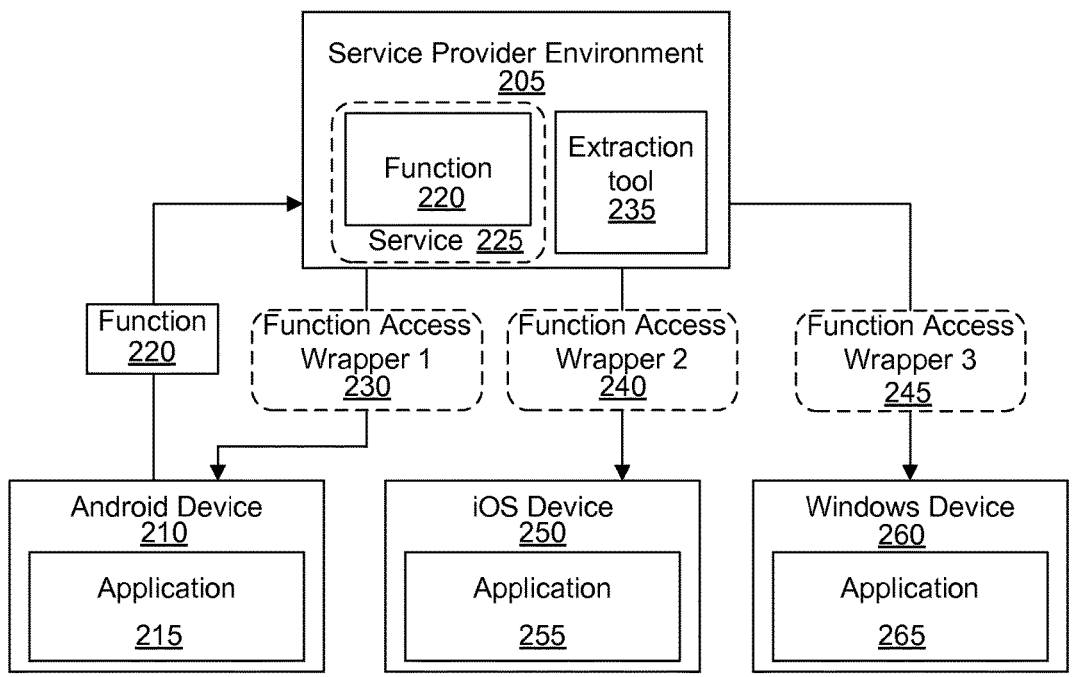
FIG. 2 is a schematic overview of a system for extracting a function from an application on a platform for execution in a service provider environment and for providing function access wrappers for applications on multiple disparate platforms in accordance with an example of the present technology.

With reference to the example in FIG. 2, a function 220 may be extracted from an application 215 on an Android device 210 using an extraction tool 235 and implemented as a service 225 in the service provider environment 205. A function access wrapper 1 230 may be generated to replace the function 220 in the application 215. To re-use the function 220 on additional platforms 250, 260, additional function access wrappers 240, 245 may be generated. In this manner, a developer desiring to move or port an app from Android to iOS, for example, may program a UI and other operating system specific application components, but may retrieve a function access wrapper 2 240 from the service provider environment 205 specific for an iOS device 250 application 255. For example, Objective C for iOS may use different calls than Java for Android, so the function access wrapper 2 240 may provide the input/output endpoints for the Objective C calls while using an API specific to the function 220 to request the same function operations in the service provider environment 205 as is available via the function access wrapper 1 230 for the Android device 210. Similarly, a function access wrapper 3 245 may be generated for an application 265 on another platform, such as for a Windows device 260.

The present technology may thus enable developers to leverage the same portion of code in multiple applications and/or across multiple platforms. Because the function access wrappers call an API for the service 225, the underlying code of the function 220 in the service provider environment 205 may be agnostic to the code used for the platform in which the function access wrapper is implemented. Developers may be able to more easily move an application from one platform to another without having to rewrite the business logic used in an original application. An SDK may be created for each language permitted to call the service. The SDK may be or may include the function access wrapper. The SDK may be replacement code to take the place of the original function to ensure the application compiles and executes properly. SDKs for other platforms or languages may be generated at the service provider environment. Any particular application may use an SDK specific for the language or environment of that application. SDKs generated may be made available in the service provider environment for download or storage by an application or client. When a function is uploaded to the service provider environment, a link (e.g., a URL (uniform resource locator)) may be returned for downloading the SDK to put in the original application in place of the function. Additional links may also be generated and provided linking to other SDKs for individual download. Alternatively, a single link may be provided for retrieving each of the generated SDKs together, such as in a single compressed file or archive.

As used herein "virtual computing" may refer to the use of computing services (hardware and/or software) which may be available at a remote location from the users of the computing services and the virtual computing services may be accessible over a network, such as the Internet. Users may be able to buy these computing services (including storage, computing power, networking and applications) as a utility on demand and sometimes by the hour. Use of virtual computing services can provide a number of advantages including cost advantages and/or the ability to adapt rapidly to changing computing service needs.

The service provider environment may be a multi-tenant service provider environment, such as a "cloud" environment for example. The service provider environment may include an execution environment or a computing instance that includes an application software stack for the user's program or application together with one or more infrastructure services for executing the user's program on a compute service. The virtualization environment or computing instance may include a user-selectable operating system (e.g., Linux, Windows, etc.), application server (e.g., Apache Tomcat), system or application configuration, etc. The virtualization environment can be configured to be accessed at a specific URL. The infrastructure services can include, but are not limited to, a load balancer to distribute workload across the requested computing services, a load scaler to scale computing services in response to load or demand variations, a firewall or other service to control access to the computing services, a monitoring interface that permits the user to monitor execution of applications, data storage resources (e.g., scalable volume block storage), and so forth. In some embodiments, the user may be able to select one or more services that may be accessed in the virtualization infrastructure. For example, the user may be able to select from a plurality of database models (e.g., a relational database, SQL database, NoSQL database, Oracle database, etc.). In some embodiments, the infrastructure services can be customized to the user rather than being a shared resource among a plurality of users. For example, in some such embodiments, the load balancer can be individually customized to the user's application rather than being shared or distributed among a number of users of the computing service provider.

The service provider environment may be capable of delivery of computing and storage capacity, as well as other computing services, as a service to a community of end recipients. In an example implementation, the service provider environment may be established for an organization (i.e., a "customer") by or on behalf of the organization. That is, the service provider may offer a "virtual private cloud environment."

In one example, a service provider environment may include any number of server computers for a compute service. The server computers may provide computing services for executing software or computing instances, which may also be referred to as virtual machines. A virtual machine may generally be an instance of a software implementation of a machine (i.e. a computer) that executes computer code like a physical machine.

An application may be software or a computer program, such as may be designed to help a person perform an activity. An application may manipulate text, numbers, graphics, etc. Some application packages offer focused computing functions by focusing on a single task, such as numerical analysis. Other application packages, such as integrated software packages, may offer less focus but may include multiple applications to perform multiple tasks. User-written software applications tailor systems to meet a user's specific needs. User-written software may include custom numerical processing, internet services, web servers, scientific simulations, graphics rendering and animation processes, email filters and so forth. Applications executable on the local device and/or in the service provider environment may be any suitable type or form or application as may be appreciated.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware, hardware processors and with other types of computing resources.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, key-value data stores, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The systems of FIGS. 1-2 may be implemented across one or more computing devices, which may be connected via a network. For example, the computing systems, computing devices or computing resources may host various engines and/or modules and such modules may be executable by a processor of the local device. The computing systems may be implemented as a plurality of computing nodes, each of which comprises at least one processor and a memory, where the computing nodes are configured to collectively implement the modules, data stores and so forth.

A computing system may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the local device or networked computing resources according to various implementations. Also, various data may be stored in a data store that is accessible to the local device or networked computing resources. The data store may be representative of a plurality of data stores as may be appreciated. The data stored in the data store, for example, may be associated with the operation of the various applications and/or functional entities described. The components executed on the local device or networked computing resources may include any of a variety of applications, services, processes, systems, engines or functionality not discussed in detail herein.

Services provided through the service provider environment, may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

Figure 3:
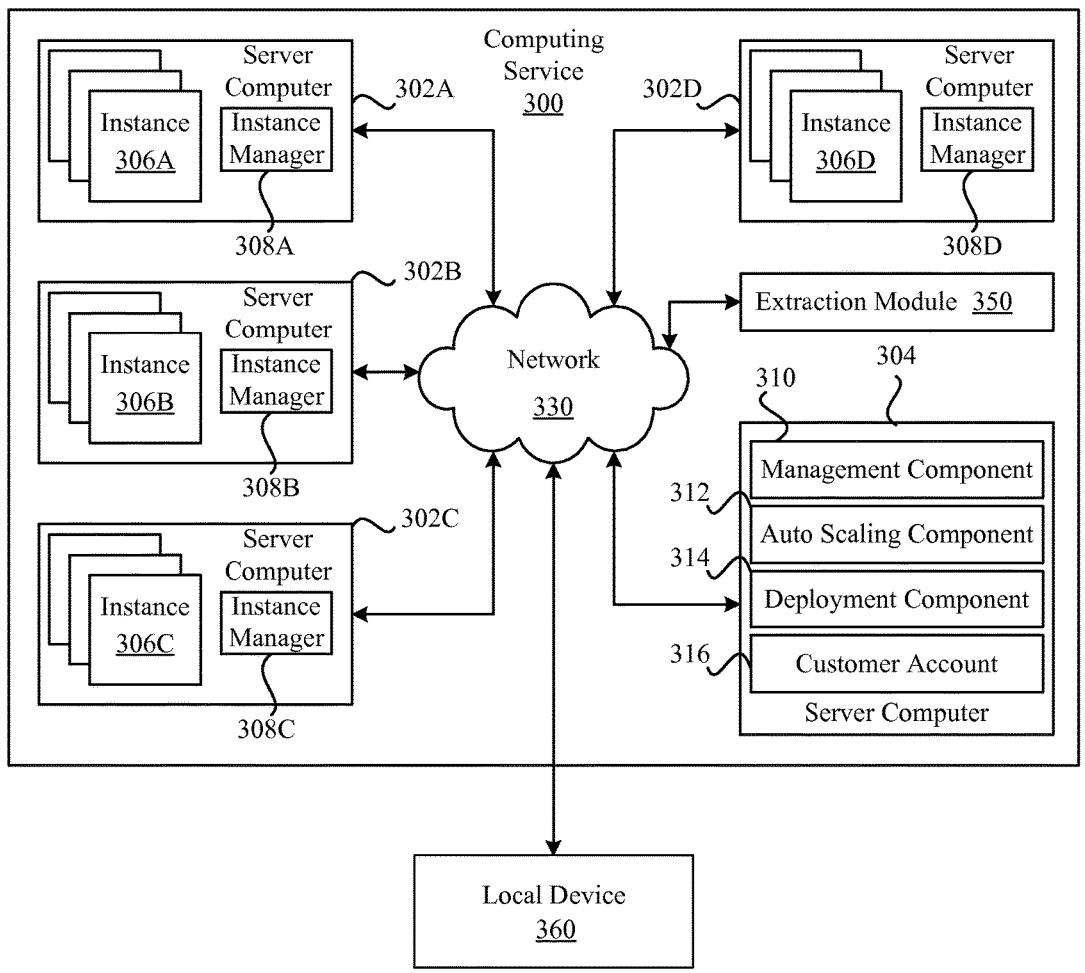
FIG. 3 is a schematic overview of a virtual computing resource provider in accordance with an example of the present technology.

FIG. 3 illustrates how components of a data center may function as a computing service 300 in a service provider environment and use this technology for auditing monitors. As discussed earlier, the computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc. running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing software instances 306A-306D. In one implementation, the instances 306A-306D may be virtual machines. A virtual machine may be an instance of a software implementation of a machine (i.e. a computer) that executes applications like a physical machine. In the example of virtual machine, each of the servers 302A-302D may be configured to execute an instance manager 308 capable of executing the instances. The instance manager 308 may be a hypervisor or another type of program configured to enable the execution of multiple instances 306 on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302 and the instances 306. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 vertically or horizontally based upon rules defined by the customer. In one implementation, the auto scaling component 312 allows a customer to specify scale-up policies for use in determining when new instances should be instantiated, including what type of instance to instantiate, and scale-down policies for use in determining when existing instances should be terminated. The auto scaling component 312 may consist of a number of sub-components executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

An extraction module 350 may be utilized to analyze an application for public functions and extract the public functions from the application. The inputs and outputs of the public functions may be identified and converted into an API interface that is callable by any application with the address of the service. The extraction module 350 may be further configured to generate one or more function access wrappers to replace the function in one or more applications across one or more computing platforms. The extraction module 350 may also implement the function as an application service in the service provider environment for remote processing of the function from local devices hosting the applications using the function.

A network 330 may be utilized to interconnect the server computers 302A-302D and the server computer 304. The network 330 may be a local area network (LAN) and may be connected to a Wide Area Network (WAN) 340 so that end users may access the computing service 300. It should be appreciated that the network topology illustrated in FIG. 3 has been simplified and that many more networks and networking devices may be utilized to interconnect the various computing systems disclosed herein.

Figure 4:
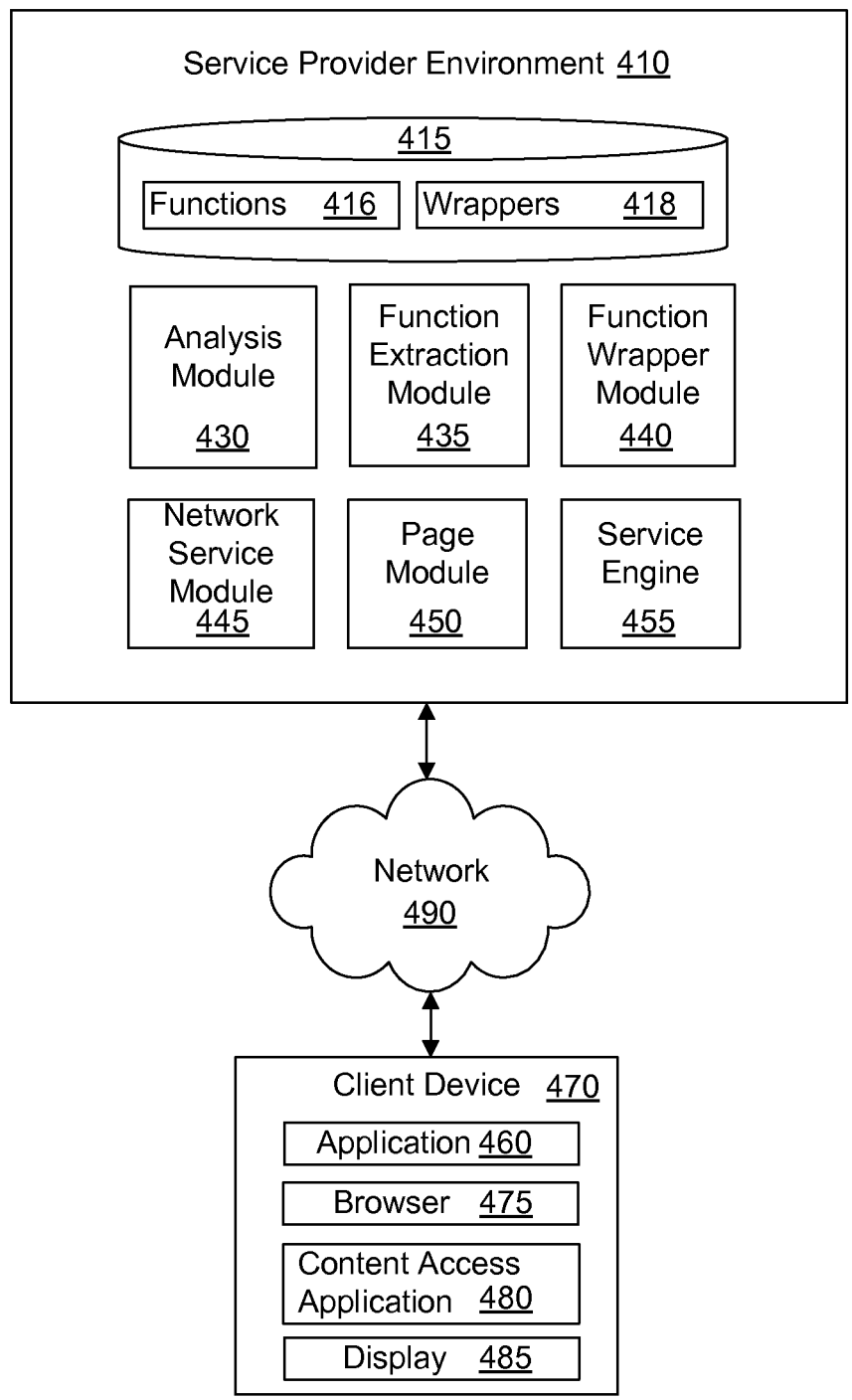
FIG. 4 is a block diagram of a system for modifying applications in accordance with an example of the present technology.

Referring now to FIG. 4, a block diagram of an application modification system for extracting functions from applications for use as a service is illustrated in accordance with an example of the present technology. The system may be implemented and accessed using one or more computing devices in a service provider environment 410, with a server as an example computing device, as well as client devices 470, and may be implemented across a network 490. The system may include a data store 415 and a number of modules 430, 435, 440, 445, 450 for storing and processing data to be used in auditing.

A user may access and manage the one or more servers over a network 490 connection, such as a connection through the Internet, for example. The user may perform various operations on the servers such as uploading functions, invoking analysis of applications, downloading function access wrappers, and so forth. These operations may be performed by the user from the client device 470.

The server(s) may be a computing instance as previously explained, and the computing instance may be implemented using a virtualization computing environment in a service provider environment, which may include a virtual distributed computing system with a virtualization layer executing on a hardware substrate layer. The hardware layer may include a plurality of physical computers, servers or processing nodes. The virtualization layer (e.g., hypervisor) may provide a platform on which computing instances may be created. In other words, the computing instances may execute on the hardware layer by using the platform provided by the virtualization layer. This computing service architecture that supports computing instances is illustrated in more detail in FIG. 3.

The system may include an analysis module 430 configured to analyze an application 460 which is configured for execution on a local device (e.g., client device 470). The analysis module 430 may be configured to identify a function, such as a public function, capable of being executed remotely from the client device 470 in the service provider environment 410.

The system may include a function extraction module 435. The function extraction module 435 may be configured to extract the function from the application 460. For example, the function extraction module 435 may copy the code representing the function from the application 460 and upload the code to or store the code at the service provider environment 410. The function extraction module 435 may further be configured to delete or otherwise remove the code representing the function from the application. The function extraction module 435 may also implement the function as a service by enabling inputs and outputs of the function to be received or sent via one or more APIs in the service provider environment 410. The system may include a service engine 455 configured to host one or more services (i.e., functions extracted from applications) for one or more applications.

The system may include a function wrapper module 440. The function wrapper module 440 may be configured to generate a function access wrapper for inclusion in the application 460 in place of the function. The function wrapper module 440 may be further configured to generate function access wrappers for additional computing platforms to enable reuse of the function in other applications. The system may also include a network service module 445 configured to communicate the function access wrapper to the client device 470.

The system may include a network page module 450. The network page module 450 may provide a network page for display, such as may be used for interfacing with the service provider environment to access, download, upload or otherwise manage stored functions, function access wrappers and so forth. The network page module 450 may enable input from a user for navigating network pages, downloading function access wrappers and so forth.

The system may include one or more data stores 415. The data store 415 may include or be configured to store any of a variety of useful types and formats of data. For example, the data store 415 may include a functions data store 416 configured to store copies of one or more functions from one or more applications 460, 480 for implementation as an application service and for access by the client device 470 and execution in the service provider environment 410. The data store 415 may also include a wrappers data store 418. The wrappers data store 418 may be configured to store available wrappers for the functions in the functions data store 416. The wrappers data store 418 may make the function access wrappers available for download for use in the place of the functions uploaded to the functions data store.

The present technology may enable mobile developers or other developers to take logic components or packages (e.g., Java Packages or JARs) and have use services generated that run the logic. These services may run or execute the application code that was previously included directly in an application 460. The code of the function in the application 460 may be replaced by a lightweight function access wrapper that calls the service created in the service provider environment 410. The present technology enables more rapid processing of logic than may be available on low-powered computing devices. Additionally, the logic from the application may be used anywhere and from many programming languages since most programming languages support making requests to a service. A further result of the present technology is a reduction in the amount of time, effort and expense involved in moving an application from one platform (such as iOS) to another (such as Android).

Client devices 470 may access data, content pages, services and so forth via a computing instance or server in a computing service provider environment 410 or one or more computing instances or clusters, over a network 490. Example client devices 470 may include, but are not limited to, a desktop computer, a laptop, a tablet, a mobile device, a television, a cell phone, a smart phone, a hand held messaging device, a personal data assistant, an electronic book reader, heads up display (HUD), or any device with a display 485 that may receive and present the message content.

The system may be implemented across one or more computing device(s) connected via a network 490. For example, a computing device may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may be a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device shown in FIG. 4 may be representative of a plurality of client devices 470 that may be coupled to the network 490. The client device(s) 470 may communicate with the computing device over any appropriate network, including an intranet, the Internet, a cellular network, a local area network (LAN), a wide area network (WAN), a wireless data network or a similar network or combination of networks.

The client device 470 may include a display 485. The display 485 may comprise, for example, one or more devices such as cathode ray tubes (CRTs), liquid crystal display (LCD) screens, gas plasma based flat panel displays, LCD projectors, or other types of display devices, etc.

The client device 470 may be configured to execute various applications such as a browser 475, a respective page or content access application 480 for an electronic retail store and/or other applications. The browser 475 may be executed in a client device 470, for example, to access and render content pages, such as web pages or other network content, such as auditing information, served up by the computing device and/or other servers. The content access application 480 may be executed to obtain and render for display auditing information from the server or computing device, or other services and/or local storage media.

In some implementations, the content access application 480 may correspond to code that is executed in the browser 475 or plug-ins to the browser 475. In other implementations, the content access application 480 may correspond to a standalone application, such as a mobile application. In one example, the content access application 480 may be an application from which a function is replaced with a function access wrapper and the function is executed in the service provider environment 410 as a service. The client device may be configured to execute applications beyond those mentioned above, such as, for example, mobile applications, email applications, instant message applications and/or other applications. Users at client devices 470 may access content features through content display devices or through content access applications 480 executed in the client devices 470.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 5:
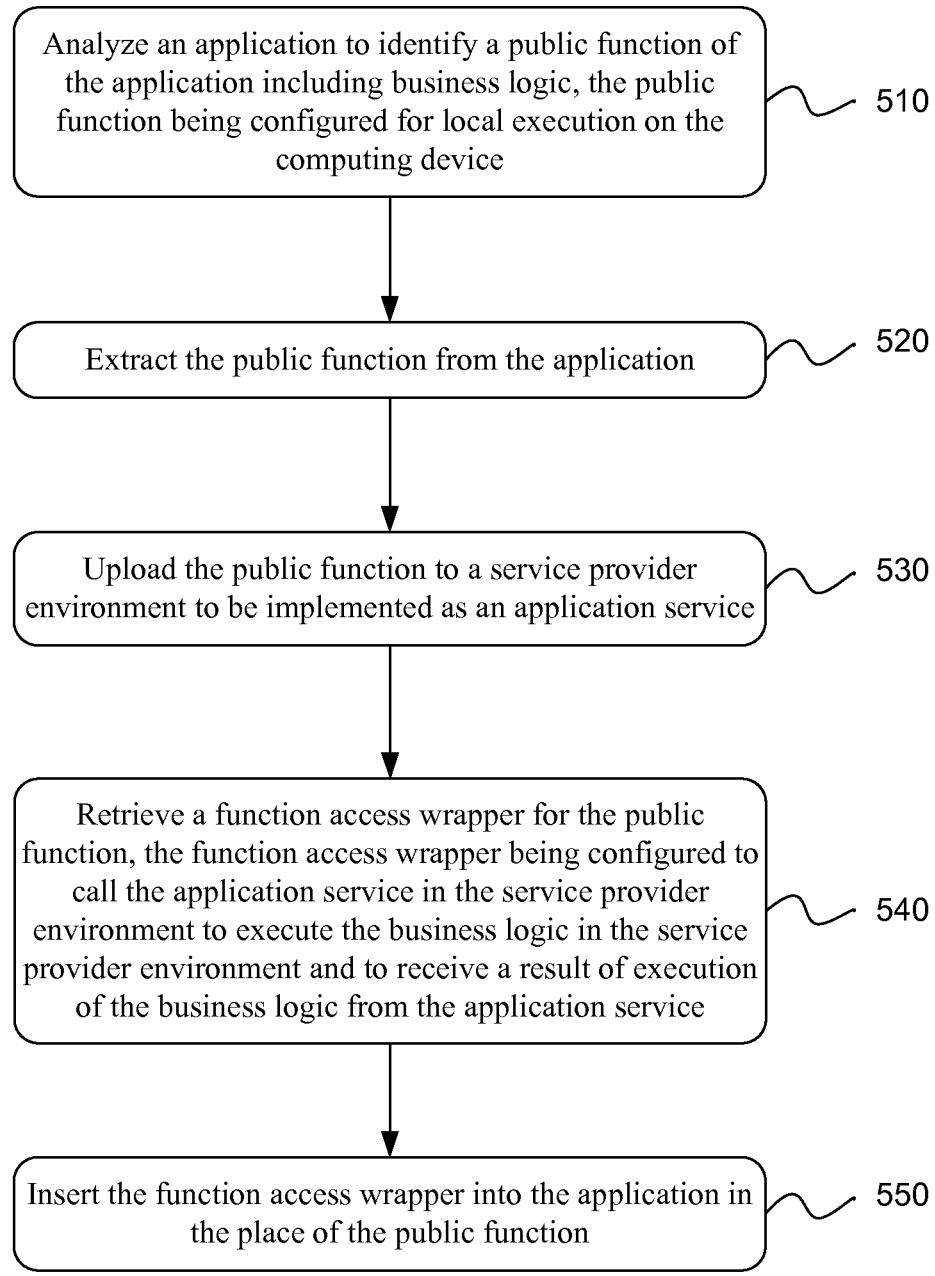
FIGS. 5-6 are flow diagrams for methods of modifying an application in accordance with examples of the present technology.
Figure 6:
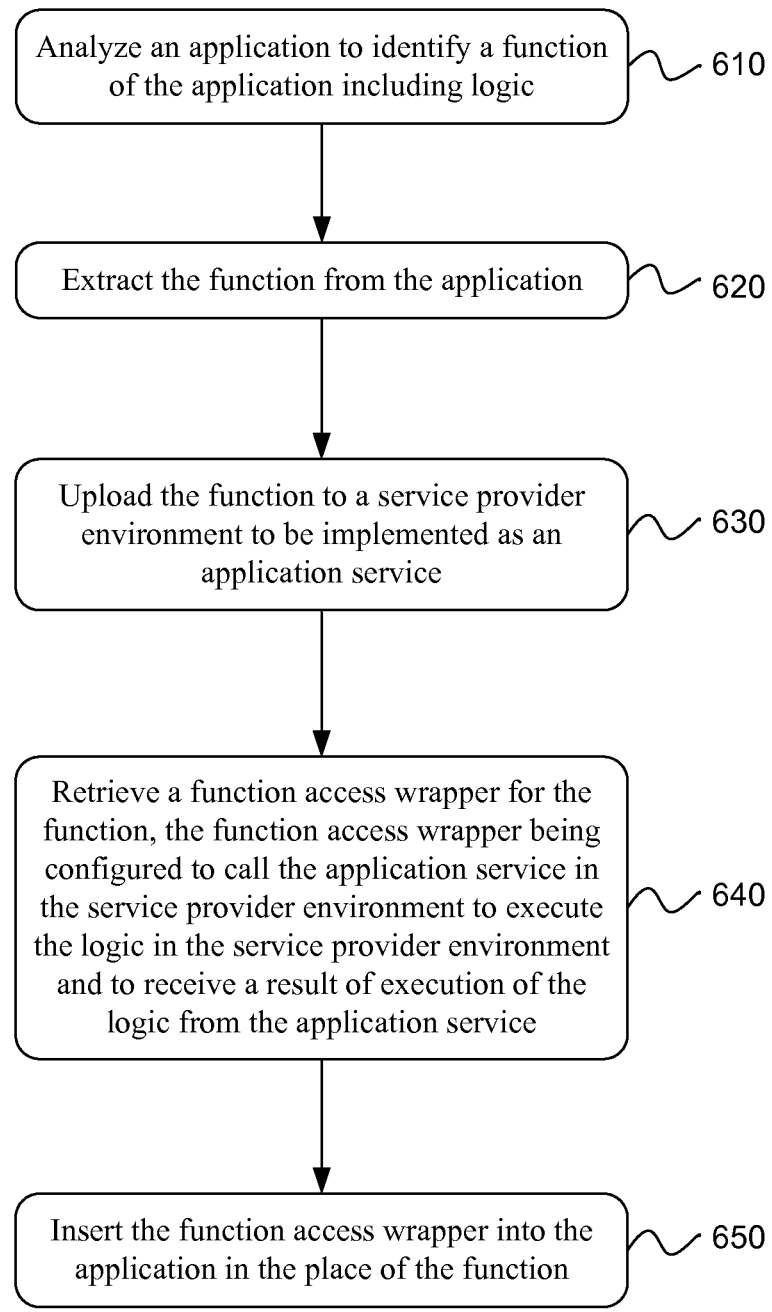

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method is illustrated for extracting a function from an application and creating a service from the function. The method may include analyzing 510 an application to identify a function of the application including business logic. The function may be either public or private, as discussed herein, but in this exemplary embodiment is public. A public function may be a function that is accessible from outside of an object oriented programming class. The application may be an application programmed in an object oriented programming language.

The public function may be configured for local execution on a computing device where the application is located. The public function may be extracted 520 from the application, such as by removing the programming code for the function from the application. The public function may be uploaded 530 to a service provider environment and may there be implemented as an application service. For example, the service provider environment may provide a virtual machine configured to execute the function code extracted from the application.

The virtual machine may generate a function access wrapper for the public function which may be retrieved 540 by the computing device from the virtual machine. The function access wrapper may be configured to call the application service in the service provider environment to execute the business logic in the service provider environment. The function access wrapper may be further configured to receive a result of execution of the business logic from the application service for use by the application. The method may include retrieving a second function access wrapper from the service provider environment which is configured for insertion into a second application. The second application may, for example, have a different code base than the first application. The first application may be configured for use on a first operating system and the second application may be configured for use on a second operating system. The first and second applications may be different versions of a same application for the first and second operating systems or may be entirely different applications that simply use the same function.

The function access wrapper may be inserted 550 into the application in the place of the public function. As a result, the application may be executed as before extraction of the public function, except that the public function is executed in the service provider environment and a result is returned to the application for continued execution of the application as if the public function were still present in the application on the computing device. In some examples, identification of the function, extraction of the functions, uploading the function to the service provider environment, and retrieving the function access wrapper may occur at the computing device and be performed by an IDE.

In some examples, this or other methods described herein may be implemented wholly or partially as computer readable program code executed by a processor and the computer readable code may be embodied on a non-transitory computer usable medium.

Referring now to FIG. 6, a flow diagram of a method is illustrated for extracting a function from an application and creating a service from the function. The method may include analyzing 610 an application to identify a function of the application including logic. The function may be a public function which is accessible from outside of an object class as understood in the context of object oriented programming. In one example, the logic may be independent of a user interface or other low level application functions.

The method may further include extracting 620 the function from the application. The function may be uploaded 630 to a service provider environment to be implemented as an application service. The application service may be executed in a virtual machine in the service provider environment. A function access wrapper for the function may be retrieved 640 from the service provider environment. The function access wrapper may be configured to call the application service in the service provider environment to execute the logic in the service provider environment and to receive a result of execution of the logic from the application service. The function access wrapper may be inserted 650 into the application in the place of the function.

The method may further include retrieving a second function access wrapper from the service provider environment, and inserting the second function access wrapper into a second application. The application may be a first application configured for use on a first operating system. The second application may be a different version of the first application configured for use on a second operating system. The second application may be configured to communicate with the application service via an application programming interface (API), which may be a same API used by the first application. The second application and the application service may optionally be programmed in different programming languages.

The method may include detecting a type of code in the application and selecting the virtual machine based on the type of code in the application. The method may also include identifying code in the application used to send or receive requests and including such code in the function access wrapper to interface between the application and the application service. The function access wrapper may be an SDK (software development kit). Multiple SDKs may be available for applications on different platforms. The method may include providing a prompt for display prompting a user to retrieve additional SDKs for a plurality of different computing platforms.

Figure 7:
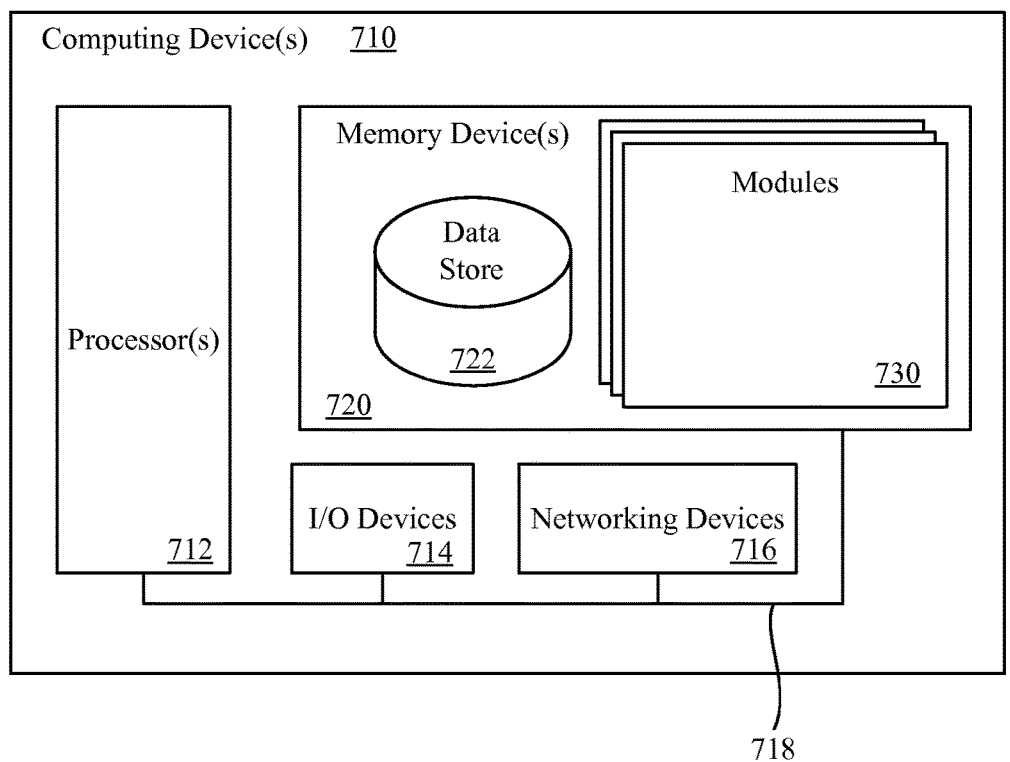
FIG. 7 is a block diagram of a computing system for auditing computing system monitors in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of a virtual computing instance, make improvements to machine learning models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two or more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computing system that is configured to convert a function of an application to an application service, comprising:
    at least one processor;
    at least one memory in electronic communication with the at least one processor;
    instructions stored in the at least one memory, the instructions being executable by the at least one processor to:
    analyze an application;
    identify a portion of the application including logic, the portion being movable from the application and the portion being within a class of the application and accessible from outside the class configured for local execution on a client device;
    extract the portion from the application;
    send the portion to a service provider environment to be setup as at least part of an application service;
    receive a function access wrapper for the portion, the function access wrapper being configured to call the application service in the service provider environment to execute the logic in the service provider environment and to receive a result of execution of the logic from the application service; and
    insert the function access wrapper into the application in place of the portion from the application.

2. The computing system of claim 1, wherein the portion of the application is a function that is accessible from outside of an object oriented programming class, the application being programmed in an object oriented programming language.

3. The computing system of claim 1, further configured to retrieve a second function access wrapper associated with the application service from the service provider environment, the second function access wrapper being configured for insertion into a second application.

4. The computing system of claim 3, wherein the application is a first application configured for use on a first operating system, and wherein the second application is a version of the first application configured for use on a second operating system.

5. A computer-implemented method, comprising:
    analyzing an application to identify a portion of the application including logic the portion being movable from the application and the portion being within a class of the application and accessible from outside the class, using at least one processor;
    extracting the portion from the application, using the at least one processor;
    sending the portion to a service provider environment to be configured as at least part of an application service;
    receiving a function access wrapper for the portion, the function access wrapper being configured to call the application service in the service provider environment to execute the logic in the service provider environment and to receive a result of execution of the logic from the application service; and
    inserting the function access wrapper into the application in place of the portion.

6. The method of claim 5, further comprising retrieving a second function access wrapper from the service provider environment, and inserting the second function access wrapper into a second application.

7. The method of claim 6, wherein the application is a first application configured for use on a first operating system, and wherein the second application is a version of the first application configured for use on a second operating system, the second application being configured to communicate with the application service via an application programming interface, and wherein the second application and the application service are programmed in different programming languages.

8. The method of claim 5, wherein the logic is independent of a user interface.

9. The method of claim 5, wherein the function is accessible from outside of an object class.

10. The method of claim 5, wherein the application service is executed in a virtual machine in the service provider environment.

11. The method of claim 10, further comprising detecting a type of code in the application and selecting the virtual machine based on the type of code in the application.

12. The method of claim 5, further comprising, identifying code in the application used to send or receive requests and including the code in the function access wrapper.

13. The method of claim 5, wherein the logic is business logic.

14. The method of claim 5, wherein the function access wrapper is an SDK (software development kit), the method further comprising providing a prompt for display prompting a user to retrieve additional SDKs for a plurality of different computing platforms.

15. A non-transitory computer-readable medium comprising computer-executable instructions which, when executed by at least one processor, implement a system, comprising:

an application analysis module configured to analyze an application for execution on a local device to identify a portion of the application capable of being executed remotely from the local device at a service provider environment wherein the portion is movable from the application and the portion being within a class of the application and accessible from outside the class;

a function extraction module configured to extract the portion from the application;

a function access wrapper module configured to generate a function access wrapper for inclusion in the application in place of the portion; and a network service module configured to communicate the function access wrapper to the local device.

16. The computer-readable medium of claim 15, wherein the portion is a public function.

17. The computer-readable medium of claim 15, wherein the application is a completed software application.

18. The computer-readable medium of claim 15, further comprising a page module configured to provide a page including links for downloading a plurality of different function access wrappers configured for use on different computing platforms.

19. The computer-readable medium of claim 15, further comprising a functions data store configured to store a plurality of functions for use as application services for multiple different applications.

20. The computer-readable medium of claim 15, further comprising a wrappers data store configured to store a plurality of function access wrappers for use on a plurality of different computing platforms.

* * * * *